US012711235B2

(12) United States Patent
Ramaiah et al.

(10) Patent No.: US 12,711,235 B2
(45) Date of Patent: Aug. 18, 2026

(54) SECURE DEPLOYMENT OF SOLUTION SPECIFIC ID MODULE DURING MOTHERBOARD REPLACEMENT

(71) Applicant: Dell Products L.P., Round Rock, TX (US)

(72) Inventors: Mahesh Babu Ramaiah, Bangalore (IN); Farhan Syed, Bangalore (IN); Ashutosh Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 323 days.

(21) Appl. No.: 18/624,530

(22) Filed: Apr. 2, 2024

(65) Prior Publication Data

US 2025/0307408 A1 Oct. 2, 2025

(51) Int. Cl.
*G06F 21/57* (2013.01)

(52) U.S. Cl.
CPC ...... *G06F 21/572* (2013.01); *G06F 2221/031* (2013.01)

(58) Field of Classification Search
CPC ... G06F 8/65; G06F 8/61; G06F 8/654; G06F 21/602; G06F 21/57; G06F 21/572; G06F 9/4401; G06F 3/0629; G06F 3/123
See application file for complete search history.

(56) References Cited

U.S. PATENT DOCUMENTS 8,286,093 B2 * 10/2012 Martinez .................. G06F 8/61 715/810
11,574,080 B1 * 2/2023 Khatri .................. G06F 21/602
11,983,302 B2 * 5/2024 Young .................. G06F 21/602
2018/0060079 A1 * 3/2018 Miller ...................... G06F 8/65
2024/0103837 A1 * 3/2024 Sayyed ................ G06F 21/602

* cited by examiner

*Primary Examiner* — Daniel B Potratz
(74) *Attorney, Agent, or Firm* — Workman Nydegger

(57) ABSTRACT

Techniques for enhancing security for replacement motherboards are disclosed. In response to a replacement motherboard being installed into a host computing system and being powered on, a service raises a replacement motherboard event flag. The service then detects an attempt to log into an out-of-band management platform of the replacement motherboard. This login involves use of a set of default credentials. In response, the service locks user access to the out-of-band management platform. The service triggers the host computing system to power on. The host computing system then initiates a BIOS boot operation. As a part of that operation, the service provides a user selectable option to restore a previously stored configuration that is usable to configure the replacement motherboard.

20 Claims, 4 Drawing Sheets

Architecture 100

SECURE DEPLOYMENT OF SOLUTION SPECIFIC ID MODULE DURING MOTHERBOARD REPLACEMENT

COPYRIGHT AND MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNOLOGICAL FIELD OF THE DISCLOSURE

Embodiments disclosed herein generally relate to security measures for replacement motherboards. More particularly, at least some embodiments relate to systems, hardware, software, computer-readable media, and methods for ensuring that proper security measures are followed when a replacement motherboard is installed into a host computing system.

BACKGROUND

Server systems shipped from factory often do not have an identity module (IDM) because they are not initially associated with a solution infrastructure (e.g., Apex, Telco, Edge, etc.). Systems that are shipped often require some predefined settings to enforce solution specific IDMs that are being enforced before shipment from the factory. Sometimes, the same system might need to have its motherboard replaced. Interestingly, however, it is typically the case that the replaced motherboards are not shipped from the original factory, but rather are shipped from a local support service center. These motherboards include a BIOS option and an out-of-band management platform (e.g., iDRAC) firmware that often do not have solution specific IDMs. As a result, these motherboards are vulnerable when installed into a host computing system. For instance, a rogue user or administrator can log into the out-of-band management platform using commonly known, default credentials. The rogue user can then take control of the entire host system once the motherboard is installed.

Current configuration restoration options are deployed through the system's BIOS. Such restoration configurations, however, provide a security hole in terms of the rogue user accessing the out-of-band management platform and pushing malicious settings and server configuration profiles. What is needed, therefore, is an improved technique to better protect replacement motherboards from being susceptible to such malicious use.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION

Edge devices can be more prone to part replacement because they are often exposed to harsh environmental conditions instead of being housed in a controlled environment, such as a data center. Although many of the examples recited herein are directed to edge devices, it should be noted how the disclosed principles are applicable to any type of device.

Motherboards are one of the parts that are often replaced. As mentioned previously, however, it is typically the case that the replaced motherboards are not shipped from the original factory but rather are shipped from a local support service center. These motherboards include BIOS and out-of-band management platform (e.g., iDRAC) firmware that often do not have solution specific IDMs. As a result, these motherboards can be vulnerable. For instance, a rogue user or administrator can log into iDRAC using the commonly known, default credentials. The rogue user can then take control of the entire system once the motherboard is installed.

The disclosed embodiments are directed to various beneficial, advantageous, and practically applicable solutions to solving the vulnerable motherboard issue described above. For instance, the disclosed embodiments beneficially define a mechanism to ensure motherboard replacement is performed in a controlled manner and is performed in a manner so as to block malicious changes and to retain solution specific settings. In particular, the embodiments ensure solution specific configurations (e.g., IDMs) are restored through a streamlined baseboard management controller (BMC) access lock mechanism.

The historically available approach expects that a user would always go through the system's BIOS, resulting in the iDRAC being open to facilitate changes and to execute malicious intent. The disclosed principles, however, focus on blocking changes through uncontrolled or unauthorized techniques and ensure settings changes are routed through a main boot path or operating system.

In this manner, the disclosed techniques describe a beneficial mechanism to sanitize replacement motherboards through a valid configuration restoration model by creating authentic access channels. Advantageously, the embodiments utilize a configuration restoration model through an onboarding operating system when confronted with situations involving brute force login attempts. In performing these operations, the security of the system will be significantly improved. Accordingly, these and numerous other benefits will now be described in more detail throughout the remaining sections of this disclosure.

Figure 1:
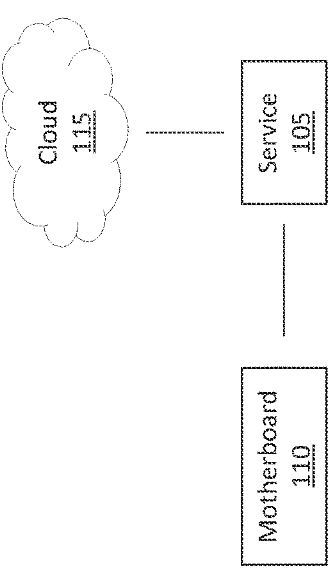
FIG. 1 illustrates an example computing architecture that can be used to ensure adequate security measures are implemented when a replacement motherboard is installed into a host computing system.

Attention will now be directed to FIG. 1, which illustrates an example architecture 100 in which the disclosed principles may be employed. Architecture 100 shows a service 105 and a motherboard 110. Service 105 can be implemented as an out-of-band management platform, such as iDRAC, on the motherboard 110.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service 105 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Typically, service 105 is a local service operating on a local device, such as the motherboard 110. In some implementations, service 105 is a cloud service operating in a cloud 115 environment. In some implementations, service 105 is a hybrid service that includes a cloud component operating in the cloud and a local component operating on a local device. These two components can communicate with one another. Service 105 is generally tasked with performing the operations listed in FIG. 2. For instance, service 105 can be implemented as a part of the motherboard's out-of-band management platform while the motherboard is installed on the host computer system.

Figure 2:
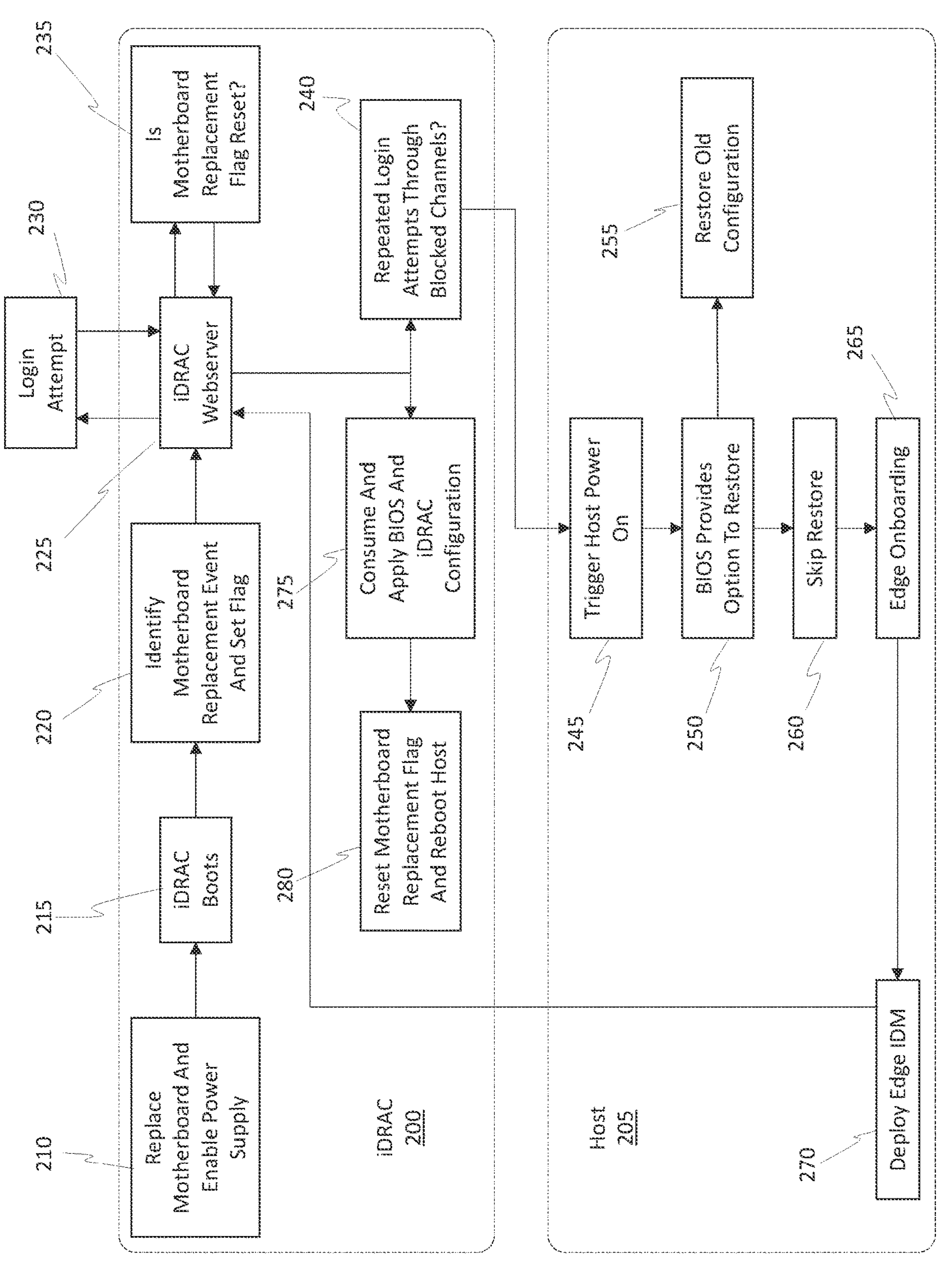
FIG. 2 illustrates a general process flow for implementing security measures for a replacement motherboard.

FIG. 2 shows an example scenario involving an out-of-band management platform 200 (e.g., perhaps "iDRAC") and a host 205. Service 105 of FIG. 1 is representative of the out-of-band management platform 200. FIG. 2 also shows a number of acts that are performed by the out-of-band management platform 200 and the host 205.

To illustrate, initially, a customer places an order for a replacement motherboard. The replacement motherboard is then delivered from the nearest local support hub.

At act 210, the old motherboard is replaced with the new motherboard. The new motherboard is provided power from the local power supply of the host 205. The now-rebuilt system has a BIOS setting and an out-of-band management platform (e.g., iDRAC) firmware.

With the motherboard now having the required external power connections, at step 215, the out-of-band management platform 200 proceeds through a power on sequence (i.e. a boot operation). Now, the out-of-band management platform 200 is fully available.

At act 220, the out-of-band management platform 200 detects a motherboard replacement situation as a part of the out-of-band management platform 200 power on sequence. In response, the out-of-band management platform 200 sets a flag within the out-of-band management platform 200 firmware and software modules of the out-of-band management platform 200. At act 225, an out-of-band management platform 200 webserver is made available.

At 230, a user tries to log into the out-of-band management platform 200 using a set of default or shipped credentials. In accordance with the disclosed principles, the embodiments block the login attempt (potentially after a number of attempts, such as 1 attempt, 2, 3, 4, 5, or more than 5 attempts) and trigger the host 205 to be powered on. The host 205 is powered on because the configuration restoration policies are available through the BIOS settings of host 205. Internally, the out-of-band management platform 200 webserver module blocks external authentication requests because of the raised motherboard replacement flag, which was raised when the out-of-band management platform 200 was powered on, as shown by act 235. As a consequence of these actions, the out-of-band management platform 200 does not permit the basic authentication bearer or bond0-based authentication requests through an out of band situation.

As shown at act 240, repeated login attempts trigger a delay and lock access to the out-of-band management platform 200, as per login policies associated with the out-of-band management platform 200. Act 240 also triggers the host to be powered on, as shown by act 245.

At act 250, the host 205 performs a BIOS boot. At this stage, the user is then provided the option (at act 255) to restore a previous configuration that has been persisted in memory. If the user chooses to restore a previous configuration, the previous configuration is retrieved from persistent locations (e.g., SPI Flash) outside of the motherboard, and the host 205 is configured using that previous configuration.

If, on the other hand, the user elects to not select the restoration option (e.g., as shown by act 260), then host 205 boots an edge onboarding operating system (OS), as shown by act 265. The edge onboarding OS pushes a native edge defined IDM, which does have all of the secure settings as required for an edge environment through an in-band channel, as shown by act 270. The IDM pushed from the edge onboarding OS triggers a reboot of host 205 to put host 205 into an appropriate edge user ecosystem. The IDM is pushed through an in-band non-bond0 IP, which can be an exception added as a part of the out-of-band management platform 200 webserver requests. This allows the host 205 to consume (as shown by act 275) the changes on out-of-band management platform 200 (and eventually BIOS) through reboots as required. At act 280, the motherboard replacement flag is reset, allowing general out-of-band access with some of the configurations secured as per the edge ecosystem.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
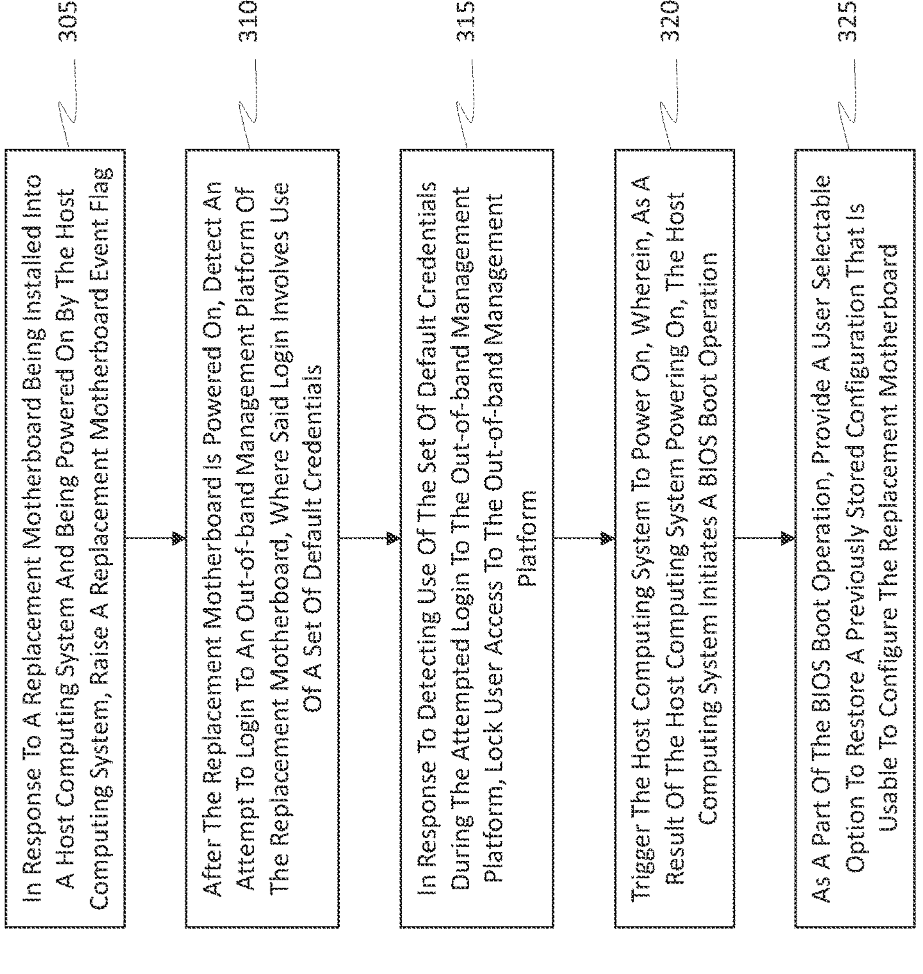
FIG. 3 illustrates a flowchart of an example method for implementing security measures for a replacement motherboard.

Attention will now be directed to FIG. 3, which illustrates a flowchart of an example method 300 for controlling access to a replacement motherboard. Method 300 can be implemented by service 105 of FIG. 1, such as the out-of-band management platform (e.g., iDRAC).

In response to a replacement motherboard being installed into a host computing system and being powered on by the host computing system, act 305 includes raising a replacement motherboard event flag. Typically, this replacement motherboard is not shipped from the original factory of the previous motherboard.

After the replacement motherboard is powered on, act 310 includes detecting an attempt to log into an out-of-band management platform of the replacement motherboard. This login involves use of a set of default credentials.

In response to detecting use of the set of default credentials during the attempted login to the out-of-band management platform, act 315 includes locking user access to the out-of-band management platform. In some cases, the out-of-band management platform blocks external authentication request when the replacement motherboard event flag is raised. Locking the user access may involve preventing the user from accessing features of the out-of-band management platform.

In some cases, attempted use of the set of default credentials is detected multiple times before the user access to the out-of-band management platform is locked. For instance, the user might try to use the default credentials 1, 2, 3, 4, 5 or more than 5 times. After the user makes these attempts with no resulting configuration being installed, the embodiments may then trigger the lock down.

Act 320 includes triggering the host computing system to power on. As a result of the host computing system powering on, the host computing system initiates a BIOS boot operation.

As a part of the BIOS boot operation, act 325 includes providing a user selectable option to restore a previously stored configuration. This previously stored configuration is usable to configure the replacement motherboard.

In some scenarios, method 300 further includes an act of receiving user input indicating that the previously stored configuration is to be used to configure the replacement motherboard. Another act includes using the previously stored configuration to then securely configure the replacement motherboard. The previously stored configuration may be retrieved from a persistent storage location of the host computing system. In some cases, the previously stored configuration is stored at a persistent location that is not included as a part of the replacement motherboard.

In some scenarios, method 300 further includes an act of receiving user input indicating that the previously stored configuration is not to be used to configure the replacement motherboard. Another act then includes causing the host computing system to boot an edge onboarding operating system. The embodiments then cause the edge onboarding operation system to implement a defined identity module for the host computing system. The defined identity module includes one or more pre-established secure settings for the motherboard. Then, the embodiments trigger a reboot of the host computing system. The replacement motherboard event flag is also subsequently reset. By performing these operations, the embodiments significantly improve the security measures for a replacement motherboard.

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
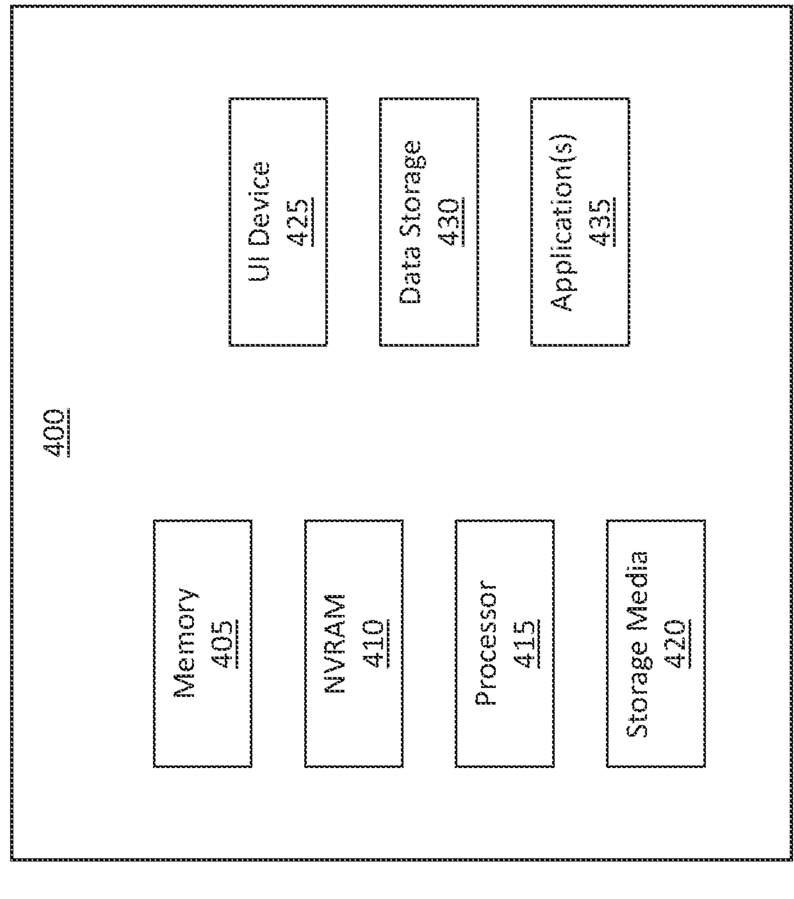
FIG. 4 illustrates an example computer system that can be configured to perform the disclosed operations.

With reference briefly now to FIG. 4, any one or more of the entities disclosed, or implied, by the Figures and/or elsewhere herein, may take the form of, or include, or be implemented on, or hosted by, a physical computing device, one example of which is denoted at 400. Also, where any of the aforementioned elements comprise or consist of a virtual machine (VM), that VM may constitute a virtualization of any combination of the physical components disclosed in FIG. 4.

In the example of FIG. 4, the physical computing device 400 includes a memory 405 which may include one, some, or all, of random access memory (RAM), non-volatile memory (NVM) 410 such as NVRAM for example, read-only memory (ROM), and persistent memory, one or more hardware processors 415, non-transitory storage media 420, UI device 425, and data storage 430. One or more of the memory 405 of the physical computing device 400 may take the form of solid-state device (SSD) storage. Also, one or more applications 435 may be provided that comprise instructions executable by one or more hardware processors 415 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The physical device 400 may also be representative of an edge system, a cloud-based system, a datacenter or portion thereof, or other system or entity.

The disclosed embodiments can be implemented in numerous different ways, as described in the various different clauses recited below.

Clause 1. A method comprising: in response to a replacement motherboard being installed into a host computing system and being powered on by the host computing system, raising a replacement motherboard event flag; after the replacement motherboard is powered on, detecting an attempt to log into an out-of-band management platform of the replacement motherboard, where said login involves use of a set of default credentials; in response to detecting use of the set of default credentials during the attempted login to the out-of-band management platform, locking user access to the out-of-band management platform; triggering the host computing system to power on, wherein, as a result of the host computing system powering on, the host computing system initiates a BIOS boot operation; as a part of the BIOS boot operation, providing a user selectable option to restore a previously stored configuration that is usable to configure the replacement motherboard.

Clause 2. The method of any of the preceding clauses, wherein the method further includes: receiving user input indicating that the previously stored configuration is to be used to configure the replacement motherboard; and using the previously stored configuration to configure the replacement motherboard.

Clause 3. The method of any of the preceding clauses, wherein the previously stored configuration is retrieved from a persistent storage location of the host computing system.

Clause 4. The method of any of the preceding clauses, wherein the method further includes: receiving user input indicating that the previously stored configuration is not to be used to configure the replacement motherboard; causing the host computing system to boot an edge onboarding operating system; causing the edge onboarding operation system to implement a defined identity module for the host computing system, wherein the defined identity module includes one or more pre-established secure settings; and triggering a reboot of the host computing system.

Clause 5. The method of any of the preceding clauses, wherein the replacement motherboard event flag is subsequently reset.

Clause 6. The method of any of the preceding clauses, wherein the out-of-band management platform blocks external authentication request when the replacement motherboard event flag is raised.

Clause 7. The method of any of the preceding clauses, wherein attempted use of the set of default credentials is detected multiple times before the user access to the out-of-band management platform is locked.

Clause 8. The method of any of the preceding clauses, wherein the previously stored configuration is stored at a persistent location that is not included as a part of the replacement motherboard.

Clause 9. A computer system comprising: one or more processors; and one or more hardware storage devices that store instructions that are executable by the one or more processors to cause the computer system to: in response to a replacement motherboard being installed into a host computing system and being powered on by the host computing system, raise a replacement motherboard event flag; after the replacement motherboard is powered on, detect an attempt to log into an out-of-band management platform of the replacement motherboard, where said login involves use of a set of default credentials; in response to detecting use of the set of default credentials during the attempted login to the out-of-band management platform, lock user access to the out-of-band management platform; trigger the host computing system to power on, wherein, as a result of the host computing system powering on, the host computing system initiates a BIOS boot operation; as a part of the BIOS boot operation, provide a user selectable option to restore a previously stored configuration that is usable to configure the replacement motherboard.

Clause 10. The computer system of any of the preceding clauses, wherein the method further includes: receiving user input indicating that the previously stored configuration is to be used to configure the replacement motherboard; and using the previously stored configuration to configure the replacement motherboard.

Clause 11. The computer system of any of the preceding clauses, wherein the previously stored configuration is retrieved from a persistent storage location of the host computing system.

Clause 12. The computer system of any of the preceding clauses, wherein the method further includes: receiving user input indicating that the previously stored configuration is not to be used to configure the replacement motherboard; causing the host computing system to boot an edge onboarding operating system; causing the edge onboarding operation system to implement a defined identity module for the host computing system, wherein the defined identity module includes one or more pre-established secure settings; and triggering a reboot of the host computing system.

Clause 13. The computer system of any of the preceding clauses, wherein the replacement motherboard event flag is subsequently reset.

Clause 14. The computer system of any of the preceding clauses, wherein the out-of-band management platform blocks external authentication request when the replacement motherboard event flag is raised.

Clause 15. The computer system of any of the preceding clauses, wherein attempted use of the set of default credentials is detected multiple times before the user access to the out-of-band management platform is locked.

Clause 16. The computer system of any of the preceding clauses, wherein the previously stored configuration is stored at a persistent location that is not included as a part of the replacement motherboard.

Clause 17. One or more hardware storage devices that store instructions that are executable by one or more processors to cause the one or more processors system to: in response to a replacement motherboard being installed into a host computing system and being powered on by the host computing system, raise a replacement motherboard event flag; after the replacement motherboard is powered on, detect an attempt to log into an out-of-band management platform of the replacement motherboard, where said login involves use of a set of default credentials; in response to detecting use of the set of default credentials during the attempted login to the out-of-band management platform, lock user access to the out-of-band management platform; trigger the host computing system to power on, wherein, as a result of the host computing system powering on, the host computing system initiates a BIOS boot operation; as a part of the BIOS boot operation, provide a user selectable option to restore a previously stored configuration that is usable to configure the replacement motherboard.

Clause 18. The one or more processors of any of the preceding clauses, wherein the method further includes: receiving user input indicating that the previously stored configuration is to be used to configure the replacement motherboard; and using the previously stored configuration to configure the replacement motherboard.

Clause 19. The one or more processors of any of the preceding clauses, wherein the previously stored configuration is retrieved from a persistent storage location of the host computing system.

Clause 20. The one or more processors of any of the preceding clauses, wherein the method further includes: receiving user input indicating that the previously stored configuration is not to be used to configure the replacement motherboard; causing the host computing system to boot an edge onboarding operating system; causing the edge onboarding operation system to implement a defined identity module for the host computing system, wherein the defined identity module includes one or more pre-established secure settings; and triggering a reboot of the host computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

in response to a replacement motherboard being installed into a host computing system and being powered on by the host computing system, raising a replacement motherboard event flag;

after the replacement motherboard is powered on, detecting an attempt to log into an out-of-band management platform of the replacement motherboard, where said login involves use of a set of default credentials;

in response to detecting use of the set of default credentials during the attempted login to the out-of-band management platform, locking user access to the out-of-band management platform;

triggering the host computing system to power on, wherein, as a result of the host computing system powering on, the host computing system initiates a BIOS boot operation; and as a part of the BIOS boot operation, providing a user selectable option to restore a previously stored configuration that is usable to configure the replacement motherboard.

2. The method of claim 1, wherein the method further includes:

receiving user input indicating that the previously stored configuration is to be used to configure the replacement motherboard; and using the previously stored configuration to configure the replacement motherboard.

3. The method of claim 2, wherein the previously stored configuration is retrieved from a persistent storage location of the host computing system.

4. The method of claim 1, wherein the method further includes:

receiving user input indicating that the previously stored configuration is not to be used to configure the replacement motherboard;

causing the host computing system to boot an edge onboarding operating system (OS);

causing the edge onboarding OS to implement a defined identity module for the host computing system, wherein the defined identity module includes one or more pre-established secure settings; and triggering a reboot of the host computing system.

5. The method of claim 4, wherein the replacement motherboard event flag is subsequently reset.

6. The method of claim 1, wherein the out-of-band management platform blocks external authentication request when the replacement motherboard event flag is raised.

7. The method of claim 1, wherein attempted use of the set of default credentials is detected multiple times before the user access to the out-of-band management platform is locked.

8. The method of claim 1, wherein the previously stored configuration is stored at a persistent location that is not included as a part of the replacement motherboard.

9. A computer system comprising:

one or more processors; and one or more hardware storage devices that store instructions that are executable by the one or more processors to cause the computer system to:

in response to a replacement motherboard being installed into a host computing system and being powered on by the host computing system, raise a replacement motherboard event flag;

after the replacement motherboard is powered on, detect an attempt to log into an out-of-band management platform of the replacement motherboard, where said login involves use of a set of default credentials;

in response to detecting use of the set of default credentials during the attempted login to the out-of-band management platform, lock user access to the out-of-band management platform;

trigger the host computing system to power on, wherein, as a result of the host computing system powering on, the host computing system initiates a BIOS boot operation; and as a part of the BIOS boot operation, provide a user selectable option to restore a previously stored configuration that is usable to configure the replacement motherboard.

10. The computer system of claim 9, wherein the instructions are further executable to cause the computer system to:

receive user input indicating that the previously stored configuration is to be used to configure the replacement motherboard; and use the previously stored configuration to configure the replacement motherboard.

11. The computer system of claim 10, wherein the previously stored configuration is retrieved from a persistent storage location of the host computing system.

12. The computer system of claim 9, wherein the instructions are further executable to cause the computer system to:

receive user input indicating that the previously stored configuration is not to be used to configure the replacement motherboard;

cause the host computing system to boot an edge onboarding operating system;

cause the edge onboarding operation system to implement a defined identity module for the host computing system, wherein the defined identity module includes one or more pre-established secure settings; and trigger a reboot of the host computing system.

13. The computer system of claim 12, wherein the replacement motherboard event flag is subsequently reset.

14. The computer system of claim 9, wherein the out-of-band management platform blocks external authentication request when the replacement motherboard event flag is raised.

15. The computer system of claim 9, wherein attempted use of the set of default credentials is detected multiple times before the user access to the out-of-band management platform is locked.

16. The computer system of claim 9, wherein the previously stored configuration is stored at a persistent location that is not included as a part of the replacement motherboard.

17. One or more hardware storage devices that store instructions that are executable by one or more processors to cause the one or more processors to:

in response to a replacement motherboard being installed into a host computing system and being powered on by the host computing system, raise a replacement motherboard event flag;

after the replacement motherboard is powered on, detect an attempt to log into an out-of-band management platform of the replacement motherboard, where said login involves use of a set of default credentials;

in response to detecting use of the set of default credentials during the attempted login to the out-of-band management platform, lock user access to the out-of-band management platform;

trigger the host computing system to power on, wherein, as a result of the host computing system powering on, the host computing system initiates a BIOS boot operation; and as a part of the BIOS boot operation, provide a user selectable option to restore a previously stored configuration that is usable to configure the replacement motherboard.

18. The one or more processors of claim 17, wherein the instructions are further executable to cause the one or more processors to:

receive user input indicating that the previously stored configuration is to be used to configure the replacement motherboard; and use the previously stored configuration to configure the replacement motherboard.

19. The one or more processors of claim 17, wherein the previously stored configuration is retrieved from a persistent storage location of the host computing system.

20. The one or more processors of claim 17, wherein the instructions are further executable to cause the one or more processors to:

receive user input indicating that the previously stored configuration is not to be used to configure the replacement motherboard;

cause the host computing system to boot an edge onboarding operating system;

cause the edge onboarding operation system to implement a defined identity module for the host computing system, wherein the defined identity module includes one or more pre-established secure settings; and trigger a reboot of the host computing system.

* * * * *